US011041280B2

(12) United States Patent
Detering (10) Patent No.: US 11,041,280 B2
(45) Date of Patent: Jun. 22, 2021

(54) DEVICE FOR A SEDIMENT TRANSFER IN WATERS, AND ALSO A METHOD FOR A TRANSFER OF SEDIMENT IN WATERS

(71) Applicant: Michael Detering, Werne (DE)

(72) Inventor: Michael Detering, Werne (DE)

( * ) Notice: Subject to any disclaimer, the term of this patent is extended or adjusted under 35 U.S.C. 154(b) by 0 days.

(21) Appl. No.: 16/971,201

(22) PCT Filed: Jan. 14, 2019

(86) PCT No.: PCT/EP2019/050802
§ 371 (c)(1),
(2) Date: Aug. 19, 2020

(87) PCT Pub. No.: WO2019/161996
PCT Pub. Date: Aug. 29, 2019

(65) Prior Publication Data
US 2021/0071378 A1 Mar. 11, 2021

(30) Foreign Application Priority Data
Feb. 22, 2018 (DE) .......................... 102018104038.5

(51) Int. Cl.
*E02B 3/02* (2006.01)
*E02F 3/88* (2006.01)
*E02F 3/92* (2006.01)
*E02F 5/28* (2006.01)

(52) U.S. Cl.
CPC ............ *E02B 3/023* (2013.01); *E02F 3/8833* (2013.01); *E02F 3/9243* (2013.01); *E02F 5/28* (2013.01)

(58) Field of Classification Search
CPC ...... E02B 3/023; E02F 3/8833; E02F 3/9243; E02F 5/28
See application file for complete search history.

(56) References Cited

U.S. PATENT DOCUMENTS 3,565,491 A    2/1971 Frazier

FOREIGN PATENT DOCUMENTS

| DE | 19942472 A1 | 4/2001 |
| GB | 2161297 A | 1/1986 |
| WO | 2008122377 A1 | 10/2008 |
| WO | 2017184005 A1 | 10/2017 |
| WO | 2019161996 A1 | 8/2019 |

OTHER PUBLICATIONS

International Search Report and Written Opinion dated May 2, 2019 for Application No. PCT/EP2019/050802.

*Primary Examiner* — Tara Mayo-Pinnock
(74) *Attorney, Agent, or Firm* — Dinsmore & Shohl LLP (57) ABSTRACT

In order to meet the objective of providing a device (10) and a method for a sediment transfer in waters (80, 81, 90) that works efficiently, a device (10) comprising at least one suction line (12) and at least one receiving means (16) for receiving sediment (70), and furthermore, having at least one pressure line (14) for transferring the received sediment (70) is proposed. Following the at least one receiving means (16), at least one pump device (18) and at least one measuring device (20) for determining a sediment concentration of the received sediment (70) are arranged. The device (10) further comprises a control unit (22) having a first interface (25) for inputting target values (24) and a second interface (26) for the at least one measuring device (20), and determines a sediment concentration in the at least one suction line (12) and/or in the at least one pressure line (14). Depending on the sediment concentration, a power of the pumping device (18) is adjustable.

9 Claims, 4 Drawing Sheets

DEVICE FOR A SEDIMENT TRANSFER IN WATERS, AND ALSO A METHOD FOR A TRANSFER OF SEDIMENT IN WATERS

FIELD OF THE INVENTION

The present invention relates to a device for a sediment transfer in waters, and also a method for a transfer of sediment in waters.

BACKGROUND OF THE INVENTION

The morphology of running waters and dams is influenced by the water, but also by suspend-ed solids and sediments. Suspended solids and sediments are found in the water of practically all rivers and standing waters. In the middle reaches of undeveloped watercourses, sedimenta-tion and erosion processes are usually in equilibrium. In this state, the river bed changes only slightly. However, if a watercourse is dammed or extended, e.g. by artificial port facilities or storage basins or reservoirs for the production of drinking water and/or energy, the flow cross-section and the flow velocity of the water, especially of the watercourse below such dammed watercourses, in the so-called tailwater, will change locally. As a result, sediment is increasingly deposited at the bottom of the dammed watercourse. Sediment includes suspended solids, sands, soil material, but also organic material from plants and finally also pebbles and the like. Sedimentation is particularly noticeable in reservoirs of hydroelectric power plants, such as pumped storage power plants, where water remains in relative calm between the individual operating processes, namely pumping and turbine operation. The sediment deposited in these cases in the reservoir, unlike in natural flowing waters, is no longer eroded over the course of many years, but increases in quantity over time at the bottom of the watercourse, thereby reducing the usable depth and ultimately the usable volume for energy generation or energy storage.

Conventional sediment transfer methods known from the state of the art, with which sedi-ment deposited on the bottom of a water body is removed in order to restore the functionality of the water body, especially dammed water bodies, are essentially limited to manual removal, which is, however, time-consuming and cost-intensive. It is also possible, for example, to carry out manual dredging by means of a hopper dredger, in which collected sediment is placed in the hold of a dredging vessel and transported to another place in the water or for further use on land, but this is also very time-consuming and cost-intensive. WO 2008/122377 A1 pro-poses a method for sediment transport from dammed waters which is energy-efficient and with which it is possible to achieve an extensive approximation to a natural, undammed water system, especially in a downstream water of the dammed water. For this purpose, sediment deposits are taken up in a sediment area of a reservoir and transported to an erosion area near one or more discharge organs of a reservoir, whereby the sediments are carried away into flowing waters by the erosion processes of the discharged water caused by the current.

U.S. Pat. No. 3,565,491 discloses a stationary shipping system, in particular for sand from a trench or barge on land, for example a beach, whereby sand, for example, is stirred up by means of water under high pressure and thus a water-sand mixture is created near the inlet of a submersible pump in order to obtain a mixture of liquid and solid components suitable for pumping with the submersible pump.

The purpose of the present invention is to provide a process for the transfer of sediment in waters which is improved in comparison to the state of the art and a device suitable for this purpose which can be used for a variety of sediment transfers.

SUMMARY OF THE INVENTION

The Device for a sediment transfer in waters according to the invention comprises at least one suction line, at least one receiving structure receiving sediment and at least one pressure line transferring the received sediment. At least one pump device and at least one measuring device determining a sediment concentration of the received sediment is arranged downstream of the at least one receiving structure, wherein the device further comprises a control unit, which comprises a first interface for feeding target values and a second interface for the at least one measuring device, and determines a sediment concentration in the at least one suction line and/or in the at least one pressure line and depending on this sediment concentration a power of the pumping device can be adjusted, wherein the control unit comprises a positioning system with at least one position determining structure, so that a local position can be made available to the receiving structure via an interface and the device is designed to be movable on a body of water via the positioning system. In addition, a capacity of the absorption medium can be set, which can be used to change the rotating speed and/or water pressure, for example. It is advantageous that the at least one receiving structure and the at least one pumping device are arranged spatially separated from each other, in particular separated by the at least one suction line. The suction line is formed or arranged between the receiving structure and the suction side of the pumping device, and is preferably designed as a hose. The pressure line, however, is arranged downstream of the pumping device on a pressure side thereof. The pressure line is preferably designed at least partially as a hose for transferring the absorbed sediment, for example on land, on a ship, a raft or via a dam into a downstream water. But also an arrangement with a combined structure of receiving structure and pumping device is possible. This can then be arranged on the bottom of a water body from which sediment is to be removed and transferred. However, it is preferable to arrange the at least one pumping device at a distance from the receiving structure, preferably on a buoyant device, in particular a pontoon or boat or floating platform, which may more preferably serve as a central device. Where two or more pumping devices are provided, they may be arranged on a single floating device, but alternatively on several devices, for example, each individual pumping device on exactly one floating device. Preferably the at least one receiving structure is arranged on a bottom, engaging a bottom and/or above a bottom of a body of water. Preferably, the at least one receiving structure is arranged at a short distance, for example at a distance of about 1 cm to about 100 cm from the bottom of the water body. If the at least one receiving structure is arranged on the bottom, it is towed in particular over the bottom, especially if it is designed as a flushing head or milling cutter, the latter also in combination with one or more flushing nozzles or suction nozzles. Preferably, one receiving structure is assigned to a pumping device, but two or more receiving structure can also be assigned to a pumping device. It is advantageous in an arrangement at a distance from the at least one pumping device and the at least one receiving structure that the at least one receiving structure can be guided over the bottom of a body of water by structure of the at least one suction line without any further securing due to its lower weight than in the case of a design with combined pumping device, without the need for separate control. It is sufficient for the buoyant device to be movable in order to guide the at least one receiving structure. Over a known length of the at least one suction line, the position of the at least one receiving structure can be clearly determined. Also, with this preferred spaced arrangement, the at least one measuring device can be arranged behind the at least one pumping device, so that the measurement of the sediment concentration can be carried out with high accuracy. The at least one measuring device is preferably arranged on the buoyant device downstream of the at least one pumping device, and further preferably separated from the latter by at least one compensator, as described below.

The at least one receiving structure serves in particular for receiving sediment. By arranging the at least one pumping device downstream of the at least one receiving structure, preferably at a distance as described above, it takes up sediment by generating a suction effect and transports it in the direction of the at least one pumping device. Furthermore, the at least one receiving structure preferably has the function of loosening sediment from the bottom of a water body and/or to loosen it. Such a loosening and/or loosening of sediment from the bottom of a body of water is preferably achieved by hydraulic or mechanical force application. The receiving structure is preferably a milling cutter, suction nozzle, flushing nozzle and/or suction head. It is particularly preferably designed as a milling cutter on which at least one, preferably two, more preferably several suction nozzles or rinsing nozzles are arranged. The milling cutter engages in the sediment and loosens or detaches it from the bottom of the body of water, preferably resting on the bottom of the body of water. The one or more flushing nozzles or suction nozzles are arranged on the milling cutter, preferably at a distance from the bottom of the body of water, especially at a distance of about 1 cm to about 100 cm.

Preferably, the at least one receiving structure is positioned on a water body bottom. Preferably it is connected to the at least one pumping device via at least one suction line. Furthermore, it is preferable for the receiving structure to have a loosening function for sediment on the bottom of a water body. For this purpose it is preferably designed as a milling cutter with at least one suction nozzle and/or flushing nozzle, which is connected to at least one pumping device via at least one suction line. If a loosening function is also exercised, it is also preferable to arrange the at least one pick-up device at a distance from the at least one pumping device, especially as described above and above, as loosening of sediment can impair the pump function. Also, a combination of receiving structure with sediment loosening function and pumping device would be too heavy to be moved safely over a water body bottom without additional aids. Preferably, the at least one receiving structure is led via at least one suction line, and only via at least one suction line connected to a floatable device on the bottom of the water. Additional control structure etc. are then not necessary and can be omitted. Due to its weight, the at least one receiving structure follows the surface of the water body bottom and can pick up sediment there. If necessary, ballast may also be arranged on the at least one receiving structure, if its own weight is not sufficient for guidance on the surface of the water bottom. However, the receiving structure may also be held in position underwater relative to the floating device or floating devices by auxiliary structure, for example more than one rope, more than one chain or combinations thereof, the length and position of the auxiliary structure being variable.

By means of the device according to the invention, it is advantageously possible to achieve a targeted sediment transfer from one body of water to another body of water, e.g. a downstream water or flowing water body, or to a storage location outside of a body of water on land for processing of the transferred sediment by treatment plants. The device according to the invention and the process according to the invention that can be carried out with it can thus be used or carried out very cost-efficiently. In particular, even in the event of possible malfunctions of the receiving medium, whereby then mainly only water or suspended solids instead of sediment is received, conveyed and transferred, this can be detected and countermeasures can be set, even automatically. Especially preferred is the fully automated operation of the device according to the invention, so that the process according to the invention can be carried out cost-effectively due to the possibility of remote maintenance and control. This enables considerable cost savings to be made, particularly by saving hours of work. Finally, it is advantageous with the device and the process according to the invention to adjust the sediment concentration in a water body into which sediment is transferred in a manner close to nature, so that problems such as a colmation of a gravel gap system, if present, can be prevented. In preliminary investigations, a transferable sediment concentration can be determined for this purpose, e.g. of a downstream water of a dammed water body or a flowing water body into which the sediment is transferred, and on the basis of a target value determined in this way, which is in particular a limit value of the transferable sediment quantity, via a feed into the control unit of the device according to the invention and in dependence on the power of the at least one pumping device and/or the at least one receiving structure by means of the at least one measuring device can be set in such a way that a sediment concentration close to natural for a downstream water or flowing water can be set.

According to the invention, the control unit comprises a positioning system with at least one position determining structure so that a local position can be made available to the receiving structure via an interface. In this way a targeted guidance of the receiving structure on a water body bottom can be achieved. Further specifications can also be taken into account here, for example the position of a central unit in the device according to the invention, preferably in the form of a buoyant device, preferably with at least one pontoon, which comprises the control unit, but optionally also the at least one pump device and/or the at least one measuring device: Furthermore, a basin level of, for example, a reservoir, the length of at least one suction line and a direction of travel of the device of the invention can be taken into account in order to provide a local position for the receiving structure or to determine and display the position of the receiving structure. According to the invention, the device is designed to be movable on a body of water via the positioning system. The movement of the device according to the invention is advantageously continuous. The movement is carried out with regard to the at least one receiving structure as well as the at least one central unit. The central unit with the at least one pontoon can have drive structure such as motors or propellers, but is preferably designed to be moved by a cable winch system. Via the connection through the at least one suction line with the at least one receiving structure, the central unit with the at least one pontoon can then be moved to enable the receiving structure to be positioned precisely in accordance with the values determined.

In a particularly preferred embodiment of the device according to the invention, the at least one measuring device is arranged in a conveying direction of the absorbed sediment subsequent to the at least one pumping device. It is particularly preferred in this respect that sedimentation problems or a stratification of a water column caused by a whirling of the sediment-water mixture triggered by the at least one pumping device are avoided, so that the measurement effected by the at least one measuring device provides values which are at most slightly faulty with respect to the sediment concentration to be determined. The measuring accuracy of the at least one measuring device is significantly increased by such an arrangement. The arrangement of the at least one measuring device is particularly preferred in a direction of conveyance of the received and conveyed sediment about 0.1 m to about 10 m, preferably about 0.3 m to about 5 m, even further preferred 0.5 m to about 2 m behind the at least one pumping device. If the distance between the at least one pumping device and the at least one measuring device is significantly greater than 10 m, for example 20 m, the accuracy of the measured values for the sediment concentration decreases due to the then decreasing whirling or turbulence with settlement phenomena or stratification of sediment in the suction pipe and/or pressure pipe, preferably in the pressure pipe or at least downstream of the at least one pumping device. Preferably the at least one measuring device is arranged immediately downstream of a compensator which is part of the pressure line or immediately downstream of the at least one pumping device.

In a particularly preferred embodiment of the device according to the invention, at least one compensator is arranged between the at least one pumping device and the at least one measuring device for oscillation damping or oscillation suppression. Oscillations in the sense of the present invention also include vibrations etc., which are caused in particular by the at least one pumping device, but also by a cable winch drive or motors or propellers to achieve movability of the device according to the invention. The compensator makes it possible to suppress or reduce these oscillations, which would falsify the measuring result, also by influencing a turbulence of the sediments on the pressure side of the pumping device in front of the at least one measuring device. It is preferable that the at least one measuring device downstream of the compensator provides sufficient, but also not too much turbulence of the sediments, so that a measurement can be carried out in a sensible manner. It must also be taken into account that deposits and stratifications in the compensator itself or in a hose connected to it before the measuring device must be avoided, as these would falsify the measuring result. The compensator can be arranged directly downstream of the pumping device, but also at a distance from it. In a particularly preferred design, at least one measuring device is arranged downstream of the compensator in the direction of flow of the transported sediment, preferably directly downstream. The compensator is part of the pressure line, so that it provides a pressure line section between the pumping device and the measuring device. Subsequent to the measuring device, the further part of the at least one pressure line is then arranged in the conveying direction of the absorbed and conveyed sediment, which leads to a sediment discharge. The compensator preferably has a length in a range from about 0.1 m to about 10 m, preferably about 0.1 m to about 5 m, even more preferably 0.1 m to about 2 m, measured from the connection to the at least one pumping device. The compensator can, for example, be designed as a hose, hose section, stuffing box and/or corrugated pipe.

In a particularly preferred embodiment of the device according to the invention, the target values are selected from a group comprising a target clearing area of the sediment to be transferred, conveying times, depth information of the water body and/or limit values of the sediment concentration to be transferred. The limit values of the sediment concentration to be transferred, which depend on a sediment requirement of, for example, a downstream water or a flowing body of water into which the sediments are transferred, are relevant with regard to the regulation and setting of a sediment concentration in the pressure line and/or delivery line in the device according to the invention. Then the procedure can also be carried out efficiently and with the aim of creating a near-natural state, for example in a downstream water. A desired clearing area of the sediment to be transferred is defined, for example, by a reservoir and its formation of the reservoir bottom as well as those areas in such a reservoir in which sediment deposits are present. Usually in such a reservoir there is a sediment area and an erosion area, whereby the erosion area is present before the bottom outlets of the reservoir. However, especially in the case of pumped storage power plants, the erosion area can also be extremely small or almost disappear, depending on the operating condition of the pumped storage power plant. Conveying times as target values are particularly relevant in order to provide automated travel without the permanent presence of operating personnel for the device according to the invention, because the device according to the invention can also be operated via remote maintenance, for example. Conveying times are dependent, for example, on the operation of an energy generation system associated with the dammed watercourse, natural events such as heavy rainfall or snowmelt and the like. Preferably a bathymetric control of the device according to the invention is carried out, i.e. a local control of the at least one recording structure is carried out on the basis of a topographical shape of the relevant water body, whereby this information is specified as target values.

In a further embodiment of the device according to the invention, at least one sampling point with at least one sampling tap is provided. This allows an examination of the water quality of the transported and to be transferred sediment. The sampling point may also be provided in a bypass line in order to ensure the permanent operation of the device according to the invention and at the same time to take a sample of the taken and conveyed sediment-water mixture. A sampling point is preferably arranged in the at least one measuring device, preferably in the direction of conveyance of the sediment received and to be transferred.

The present invention furthermore refers to a method for transferring sediment in waters, wherein sediment is taken up from the water by means of a pumping device, a device, in particular such device as described above, with at least one suction line with at least one receiving structure and is transferred to another location via at least one pressure line, wherein a sediment concentration of the received sediment in the at least one suction line and/or in the at least one pressure line is determined via at least one measuring device in a conveying direction downstream of the receiving structure and is compared with target values via a control unit, and a power of the at least one pumping device and/or the at least one receiving structure is controlled as a function of the values thus determined, wherein a geographical location of the device is recorded via a position determining structure of the control unit and compared with the target values and a displacement of the device on the body of water is carried out as a function of the position values thus determined.

With the method according to the invention it is advantageously possible that the transfer of the sediment into at least one discharge member of a dammed water body, into the vicinity of a discharge member of a dammed water body, over a barrage of a dammed water body or around it into a downstream water, into a flowing water and/or on land for storage at a storage location can take place. The procedure according to the invention can thus be adapted very variably to the hydromorphological, structural, geographical and other conditions of the water body concerned. Sediment transfer is particularly preferred to be automated. Preferably, a bathymetric control of the at least one recording medium is carried out in the method according to the invention, i.e. a local control of the at least one recording medium is carried out on the basis of a topographic shape of the relevant water bottom, whereby this information is specified as target values. In this way, the procedure can be carried out particularly efficiently, in particular a limitation of the working area in a water body can be easily implemented.

BRIEF DESCRIPTION OF THE DRAWINGS

Further advantages and details of the present invention are explained in more detail using the design examples shown in the following figures.

DETAILED DESCRIPTION

Figure 2:
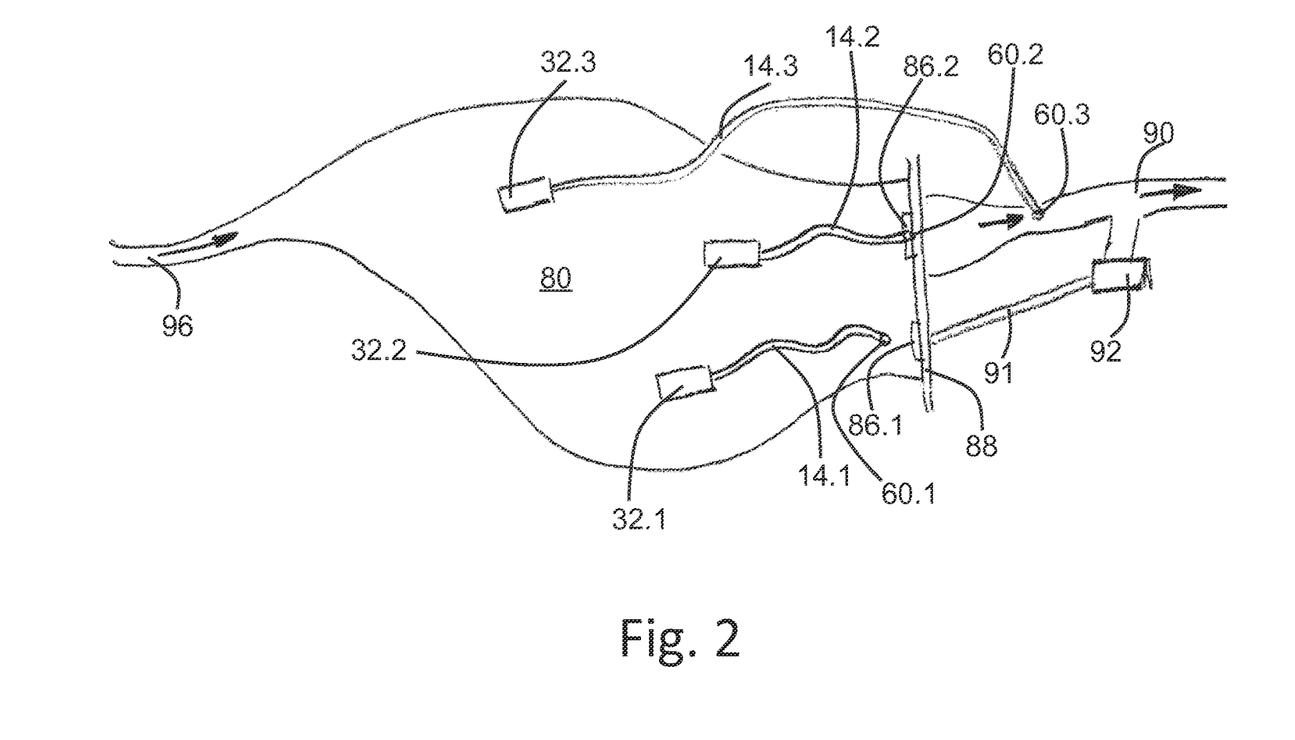
FIG. 2: a schematic view of a dammed water body with various execution examples of the procedure according to the invention.
Figure 3:
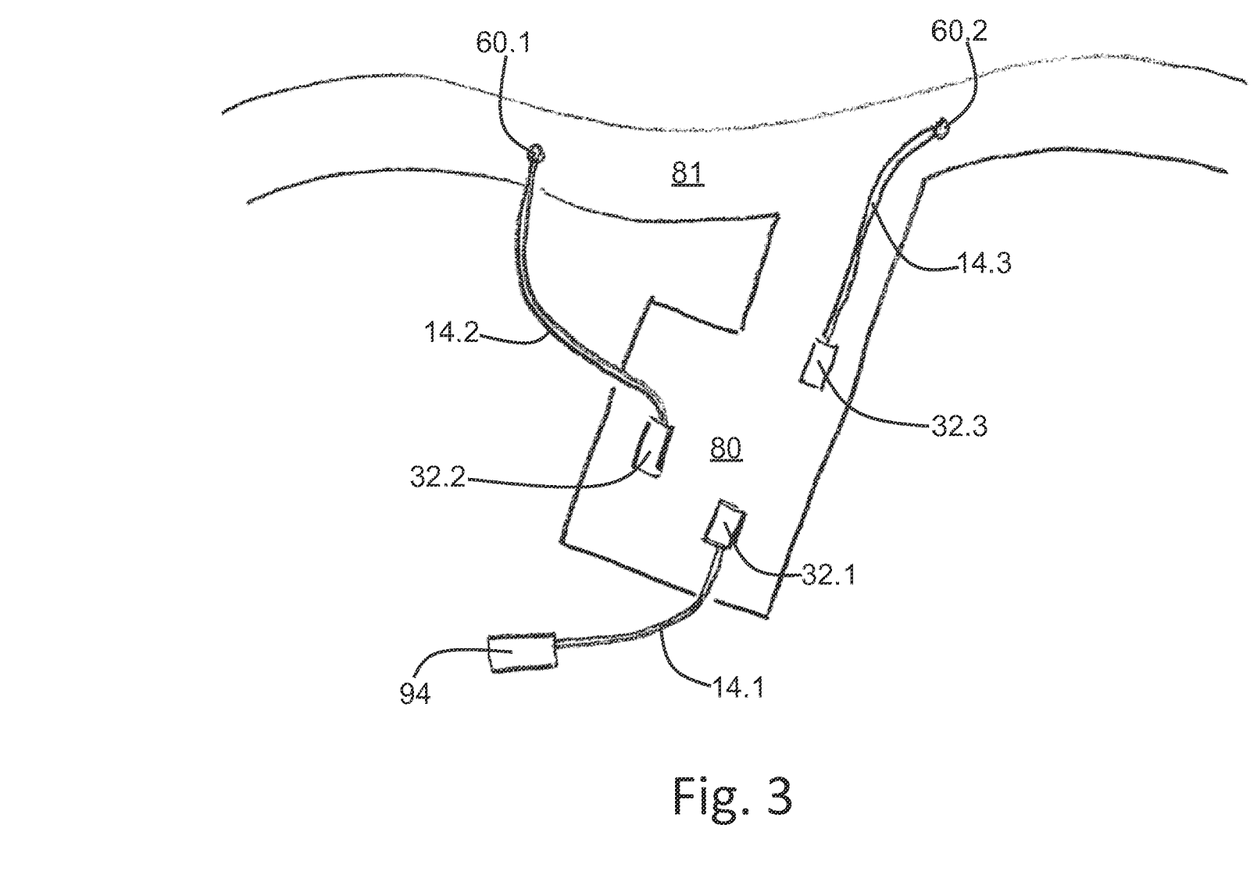
FIG. 3: a schematic view of a further alternative embodiment of the method according to the invention.

It should first be noted that the invention is not limited to the combinations of features shown in the figures. Rather, the features disclosed in the description, including the description of the figures, can be combined with those features indicated in the figures. In particular, the design examples for the method according to the invention, as shown in FIGS. 2 and 3, are only some of the possibilities of how the inventive method can be implemented. It should also be noted that a receiving structure 16 or a central unit 32 can be differently designed. In particular, only one measurement, regulation and control of the device according to the invention or one execution of the procedure according to the invention can be carried out on the basis of the provisions of the sediment concentration of the conveyed sediment. A positioning system 40 can, but need not be provided. In addition, at least one measuring device 20 and/or at least one sampling point 50 may be arranged in at least one suction line 12, i.e. upstream of a pumping device 18. In addition, the at least one suction line 12 may be extremely short and may also consist of only one flange or other fastening with at least one receiving structure 16 if the pumping device is arranged immediately after the receiving structure 16. The at least one pumping device 18 and the at least one receiving structure 16 can also be designed as one component together with the at least one suction line 12. Several receiving structure 16 can also be arranged on one suction line 12. Several suction lines 12 and/or several pressure lines 14 may also be provided. Furthermore, it should be pointed out that the reference signs included in the patent claims are in no way intended to limit the scope of protection of the present invention, but merely refer to the examples of execution shown in the figures.

Figure 1:
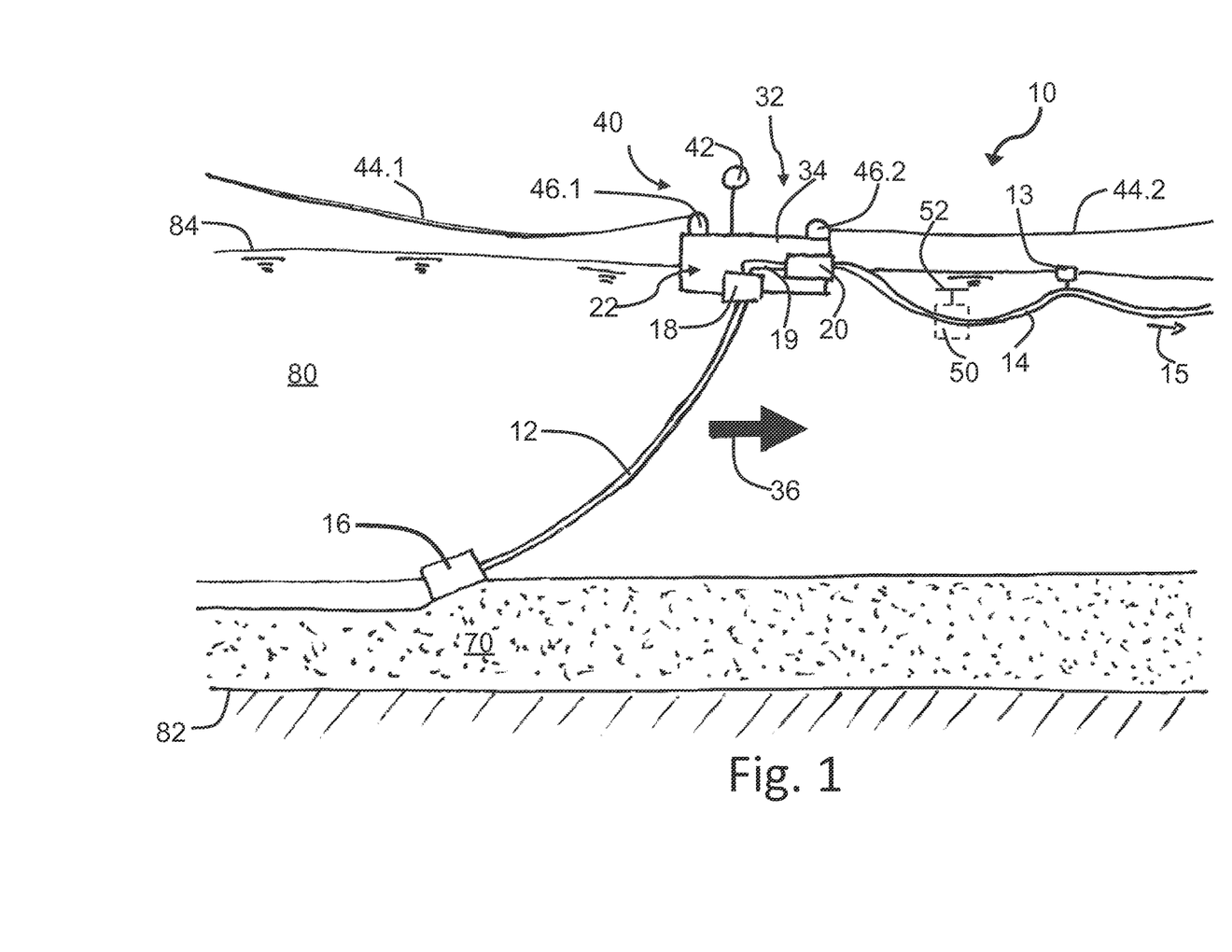
FIG. 1: a schematic view of an embodiment of the device according to the invention.

FIG. 1 shows in a schematic representation the structure of the device 10 according to the invention for a preferably automated sediment transfer in water bodies 80. A water body 80, which can be a dammed water body such as a reservoir with a dam, but also a natural lake, a harbour basin or a running water, whereby this list is not exhaustive, has a water body bottom 82 and a water body surface 84. A layer of sediment 70 has been deposited on the bottom of the water body 82. The device 10 according to the invention consists of a central unit 32 with a pontoon 34, which is designed to be movable. The traversability is enabled by a positioning system 40 in connection with exemplarily shown ropes 44.1 and 44.2, which are operated by corresponding winches 46.1 and 46.2. However, other ways of creating a moveability are also conceivable; in particular, more than two ropes 44.1 and 44.2 and more than two winches 46.1 and 46.2 can be provided. However, other ways of creating a moveability are also conceivable; in particular, more than two ropes 44.1 and 44.2 and more than two winches 46.1 and 46.2 may be provided. Thus, for example, a motor may also be provided on pontoon 34 to create a traversing facility, preferably in combination with at least one anchoring of the pontoon 34 in the body of water 80, or a propeller drive. Using a positioning structure 42, which is connected to a control unit 22 via an interface 43 (see FIG. 4), whereby the positioning structure may be designed as a GPS or other satellite receiver, the geographical location of the central unit 32 or of the pontoon 34 can be determined and transmitted to the control unit. The central unit 32 with the pontoon 34 is preferably moved continuously, whereby the receiving structure 16 is then also moved along and removes sediment 70 on the bottom of the water 82.

A pumping device 18 is arranged on the pontoon 34 and thus the central unit 32, followed by a measuring device 20, between which in the example shown here a compensator 19 is preferably provided. The compensator 19 can, in order to provide a damping or suppression of oscillations or vibrations, for example consist of a rubber hose, which preferably has a length of at least about 0.1 metres, preferably with a length of up to about 10 metres. The length of the compensator is preferably between about 0.1 meter and 10 meters, more preferably between 0.3 meter and 5 meter, and even more preferably between 0.5 meter and 3 meter. With regard to the length of the compensator, which may also have a different design than a rubber hose and may, for example, consist of different coupling elements, it is essentially important to ensure that a compromise is found between good manageability when installing the device according to the invention and the function of the latter to provide oscillation or vibration suppression or damping. The at least one measuring device 20 is preferably arranged subsequent to the at least one pumping device 18 in the sense of the present invention. This avoids measuring errors which result from stratifications in the pumped sediment-water mixture or sedimentation problems of the sediment 70. The at least one pumping device 18 produces a whirling of the sediment-water mixture which favours a measurement. It is therefore preferable to arrange the at least one measuring device 20 about 0.3 metres to about 5 metres behind the at least one pumping device. The at least one measuring device 20 can also be arranged under water.

The at least one measuring device 20 may be designed, for example, as a Coriolis meter or densitometer, as a radiometric measuring device or as a magnetic-inductive flow meter and carries out a mass flow measurement to determine a sediment concentration in the received and transported sediment 70, preferably and as shown in FIG. 1, in a pressure line 14 designed as a hose, which is designed for transferring the sediment 70. The at least one pressure line 14 is arranged on a pressure side of the at least one pumping device 16 in the sense of the present invention and represents a conveying structure for the sediment 70. The pumping device 18 is connected via a suction line 12, which is also designed as a hose and arranged on a suction side of the pumping device 18, to a receiving structure 16, which can be designed as a milling cutter, suction nozzle, flushing nozzle and/or suction head, for example. A rotating speed and/or a water pressure of the receiving structure 16 can be set. This setting can be adjusted via the control unit 22, which is assigned to the central unit 32. The pumping device 18 can, for example, be designed as a centrifugal pump, water jet pump, air lift device or rotary piston pump. When using an air-lift device, compressed air is injected at the receiving structure 16. The resulting difference in density between the water-air mixture created in the pipe and the surrounding water leads to a strong flow in the pipe, similar to a water jet pump, but with air. In this case, the suction line 12 is the area between receiving structure 16 and the at least one injection point for the compressed air, which can also be located directly at the receiving structure 16. Receiving structure 16, suction line 12 and pump device 18 can be designed as one component in an air-lift device.

A sampling point 50 with a sampling tap 52 is arranged in the pressure line 14. A sample can be taken there, for example, to calibrate the device 10, but also to check the pumped mixture of sediment and water regularly. The pressure line 14 is exemplarily held below the water surface 14 by a float 13.

Via the positioning system 40, the central unit 32 with the pontoon 34 and the control unit 22 can be moved in a travel direction 36, represented by an arrow. The positioning system 40 may not only comprise the winch system shown in FIG. 2, but also, for example, propellers or other adjusting devices.

In a conveying direction 15, the mixture of sediment 70 and water is transferred to another location through the pressure line 14. FIGS. 2 and 3 show different possibilities of transport. FIG. 2 shows a dammed water body 80 with an inflow 96 and a barrage 88 in the form of a dam with two discharge members 86.1 and 86.2, which correspond, for example, to a bottom outlet of a dam wall. However, other water outlets of a water body 80 could also be used. Sediment is conveyed and transferred via a central unit 32.1 in an embodiment of the procedure according to the invention, which is shown in FIG. 2, via the pressure line 14.1 to a sediment discharge 60.1 in the vicinity of the discharge member 86.1, which then, as known from WO 2008/122377 A1, reaches a downstream water 90 via the discharge member. As shown in FIG. 2, it can be provided that the discharge member 86.1 is connected via a tunnel 91 to a power plant unit 92, e.g. a turbine, as far as the dammed water 80 also serves for power generation. In a second embodiment of the method according to the invention as shown in FIG. 2, sediment is conveyed and transferred via a central unit 32.2 and a pressure line 14.2 directly into a discharge device 86.2, which in turn can be designed as a bottom outlet, via a sediment discharge 60.2, so that this sediment is then discharged into the downstream water 90. In a third embodiment of the method according to the invention as shown in FIG. 2, sediment is conveyed via a central unit 32.3 and a pressure line 14.3 and transferred to a sediment discharge 60.3 directly into the downstream water 90 around or over the barrage 88.

FIG. 3 shows a further alternative design of the method according to the invention with a water body 80 in the form of a harbour basin which is connected to a watercourse 81. In a first embodiment of the method according to the invention, sediment is conveyed via a central unit 32.1 and a pressure line 14.1 and transferred to a storage location 94 for further processing of the sediment or its storage. The storage location 94 is on land. It may, for example, contain sediment 70 treatment plants for which it is important to be supplied with a predetermined quantity of sediment 70. In a second embodiment of the method according to the invention, sediment is transported and transferred via a central unit 32.2 and a pressure line 14.2 to a sediment discharge 60.1 and discharged directly into the watercourse 81. The same is carried out, but from another location within the port basin, in a third embodiment of the method according to the invention, via the central unit 32.3 and the pressure line 14.3 to a sediment discharge 60.2 into the watercourse 81.

Figure 4:
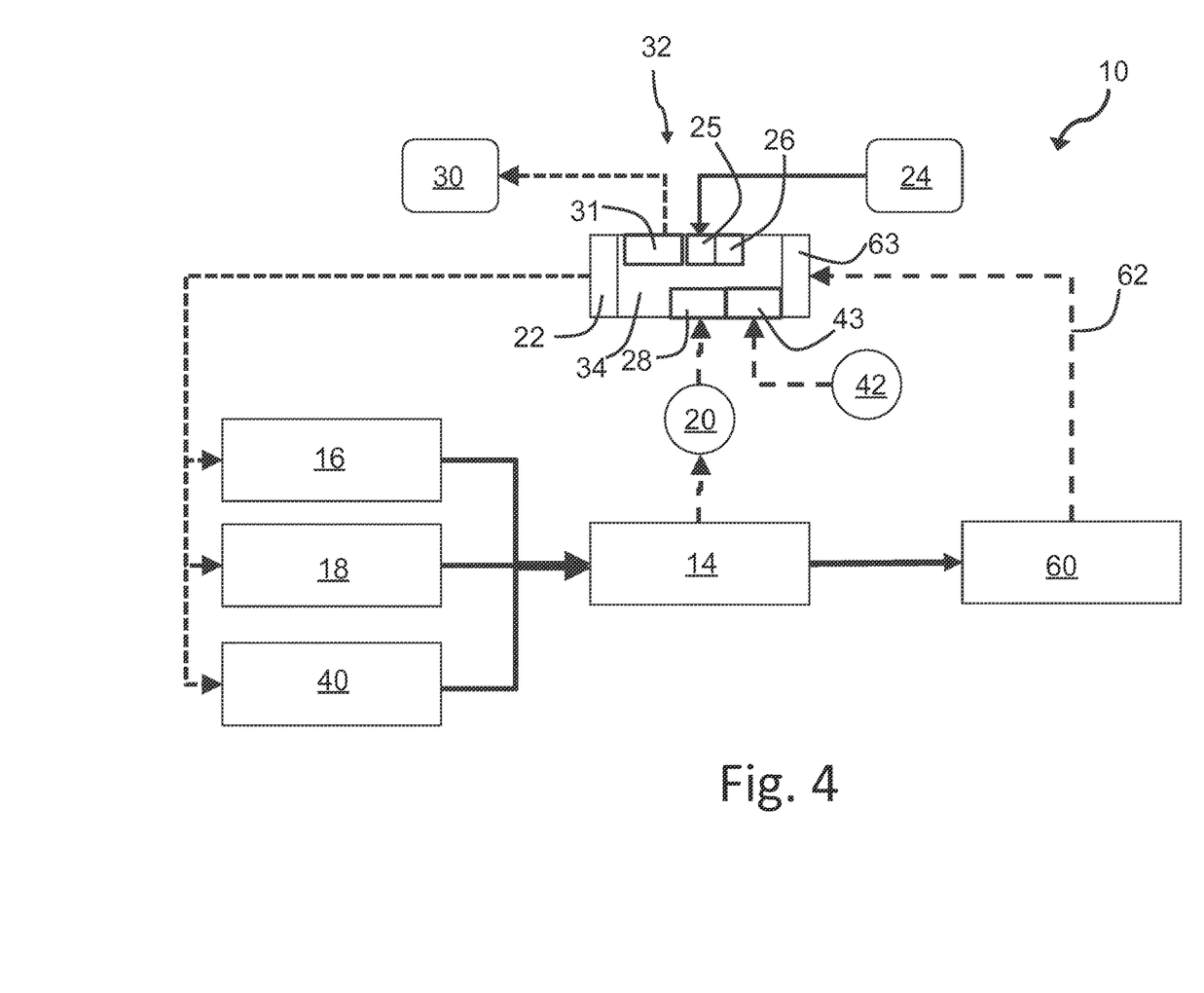
FIG. 4: a schematic view of the configuration of the control unit.

FIG. 4 shows a schematic view of the sequence of the process according to the invention for a transfer of sediment 70, preferably an automatic transfer, by which operating costs can be considerably reduced. The device 10 comprises the central unit 32 with the pontoon 34. The control unit 22 is shown schematically, which processes data received or stored on the central unit 32 and hereby regulates or controls the receiving structure 16, the pumping device 18 and the positioning system 40. Target values 24, which originate from a source not specified here, are fed into memory 26 via an interface 25. The target values are preferably selected from a group comprising a target clearing area of the sediment to be transferred 70, transport times, depth information of the water body 80 and/or limit values of the transferable sediment concentration. However, the memory 26 does not have to be present, the target values can also be transmitted online via remote data transmission, in particular continuously, or can be queried by the central unit 32, whereby a temporary storage can be provided. Likewise, measured values, determined by the measuring device 20, are fed to the central unit 32 via an interface 28, as is also the case regarding the position determination structure 42 with the assigned interface 43. Here, data obtained from sediment discharge 60, such as turbidity values of a downstream water, can also be recorded and taken into account via a feedback 62 and an interface 63. The determined values of the measuring device 20, of the positioning structure 42 and, if applicable, of the values for the discharged sediment obtained via the feedback 62, which may be available, for example, in the form of turbidity measurements, are compared with the target values 24 present in the storage unit 26 and, from this, instructions are made available to the control unit 22, which carries out a performance of the pumping device 18, but also, if applicable, a rotating speed or a water pressure of the receiving structure 16 as well as a positioning of the device 10, in particular of the pontoon 34 of the central unit 32, via the positioning system 40. Depending on this, the pumping takes place via the suction line 12 and the pressure line 14 for sediment discharge 60. The target value 24 for the limit value of the transferable sediment concentration depends on the state of the water body into which the sediment 70 is transferred, for example a water course 81 or a downstream water 90, or the storage location 94 with the treatment plants for the sediment 70 located there. In particular, this target value 24 is relevant for the control of the power of at least one pumping device 18 and/or at least one receiving structure 16 and/or the local position of at least one receiving structure 16. The control unit 22 can transmit values via an interface 31 to at least one display structure 30, which need not necessarily be present, so that the corresponding values are made visible there for an operator of the device 10. The corresponding values can also be logged and stored in the storage device 26. Other storage and display options are also conceivable.

The method and the device 10 according to the invention make it advantageously possible to carry out an automated sediment transport in waters, especially dammed waters, but also harbours and other waters. In this connection, it is essential to focus on a sediment concentration of the received sediment, preferably on the pressure side of the at least one pumping device in the at least one pressure line 14, so that a downstream water or other body of water into which the sediment is moved or transferred can be supplied with the pumped and transferred sediment in an ecologically compatible and targeted manner.

The invention claimed is:

1. A device for a sediment transfer in waters comprising:
   at least one suction line and at least one receiving structure receiving sediment;
   at least one pressure line transferring the received sediment;
   wherein at least one pump device and at least one measuring device determining a sediment concentration of the received sediment are arranged downstream of the at least one receiving structure; and
   wherein the device further comprises a control unit, which comprises a first interface that feeds target values and a second interface of the at least one measuring device, and determines a sediment concentration in the at least one suction line and/or in the at least one pressure line and adjusts a power of the pumping device depending on this sediment concentration, wherein the control unit comprises a positioning system with at least one position determining structure, so that a local position can be made available to the receiving structure via an interface and the device is designed to be movable on a body of water via the positioning system.

2. A device according to claim 1, wherein the at least one measuring device is arranged in a conveying direction of the received sediment subsequent to the at least one pumping device.

3. A device according to claim 1 wherein at least one compensator for oscillation suppression or oscillation damping is arranged between the at least one pumping device and the at least one measuring device.

4. A device according to claim 1 wherein the target values are selected from the group consisting of: a set clearing area of the sediment to be transferred, conveying times, depth indications of the water body and/or limit values of the sediment concentration to be transferred.

5. A device according to claim 1 including at least one sampling point with at least one sampling tap.

6. A device according to claim 3, wherein the at least one sampling point is arranged in the conveying direction of the received sediment subsequent to the at least one measuring device.

7. A method for transferring sediment in waters, wherein sediment is received from the water by means of a pumping device via a device with at least one suction line with at least one receiving structure and is transferred to another location via at least one pressure line, wherein a sediment concentration of the received sediment in the at least one suction line and/or in the at least one pressure line is determined via at least one measuring device in a conveying direction-downstream of the receiving structure and is compared with target values via a control unit, and a power of the at least one pumping device is controlled as a function of the values thus determined, and wherein a geographical location of the device is recorded via a position determining structure of the control unit and compared with the target values and a displacement of the device on the body of water is carried out as a function of the position values thus determined.

8. A method according to claim 7, wherein the transfer of the sediment takes place into at least one discharge of a dammed water body, into the vicinity of at least one discharge member of a dammed water body, via a barrage of a dammed water body or around it into a downstream water, into a watercourse and/or on land for storage.

9. A method according to claim 7 wherein the sediment transfer is performed automatically.

* * * * *